United States Patent [19]

Gorski-Popiel

[11] 4,426,712

[45] Jan. 17, 1984

[54] CORRELATION SYSTEM FOR GLOBAL POSITION RECEIVER

[75] Inventor: George Gorski-Popiel, Chelmsford, Mass.

[73] Assignee: Massachusetts Institute of Technology, Cambridge, Mass.

[21] Appl. No.: 266,679

[22] Filed: May 22, 1981

[51] Int. Cl.³ .............................................. H04K 1/04
[52] U.S. Cl. .................................... 375/96; 375/115; 370/107
[58] Field of Search .......................... 375/94, 96, 115; 370/18, 106, 107; 364/604, 728, 819

[56] References Cited

U.S. PATENT DOCUMENTS

| | | | |
|---|---|---|---|
| 4,045,796 | 8/1977 | Kline, Jr. .............................. | 375/96 |
| 4,112,497 | 9/1979 | Layland et al. ....................... | 375/96 |
| 4,122,393 | 10/1979 | Gordy et al. ......................... | 375/96 |
| 4,185,172 | 1/1980 | Melindo et al. ...................... | 375/96 |
| 4,209,834 | 6/1980 | Rabow ................................ | 375/96 |

*Primary Examiner*—Benedict V. Safourek
*Assistant Examiner*—Stephen Chin
*Attorney, Agent, or Firm*—Arthur A. Smith, Jr.; Thomas J. Engellenner

[57] ABSTRACT

A digital receiver for receiving and interpreting navigational data in the global position system comprising faster-than-real-time correlators for correlating the code portions of individual signals with matching codes stored in memory thus creating a plurality of virtual channels for acquiring and tracking each visible satellite.

7 Claims, 10 Drawing Figures

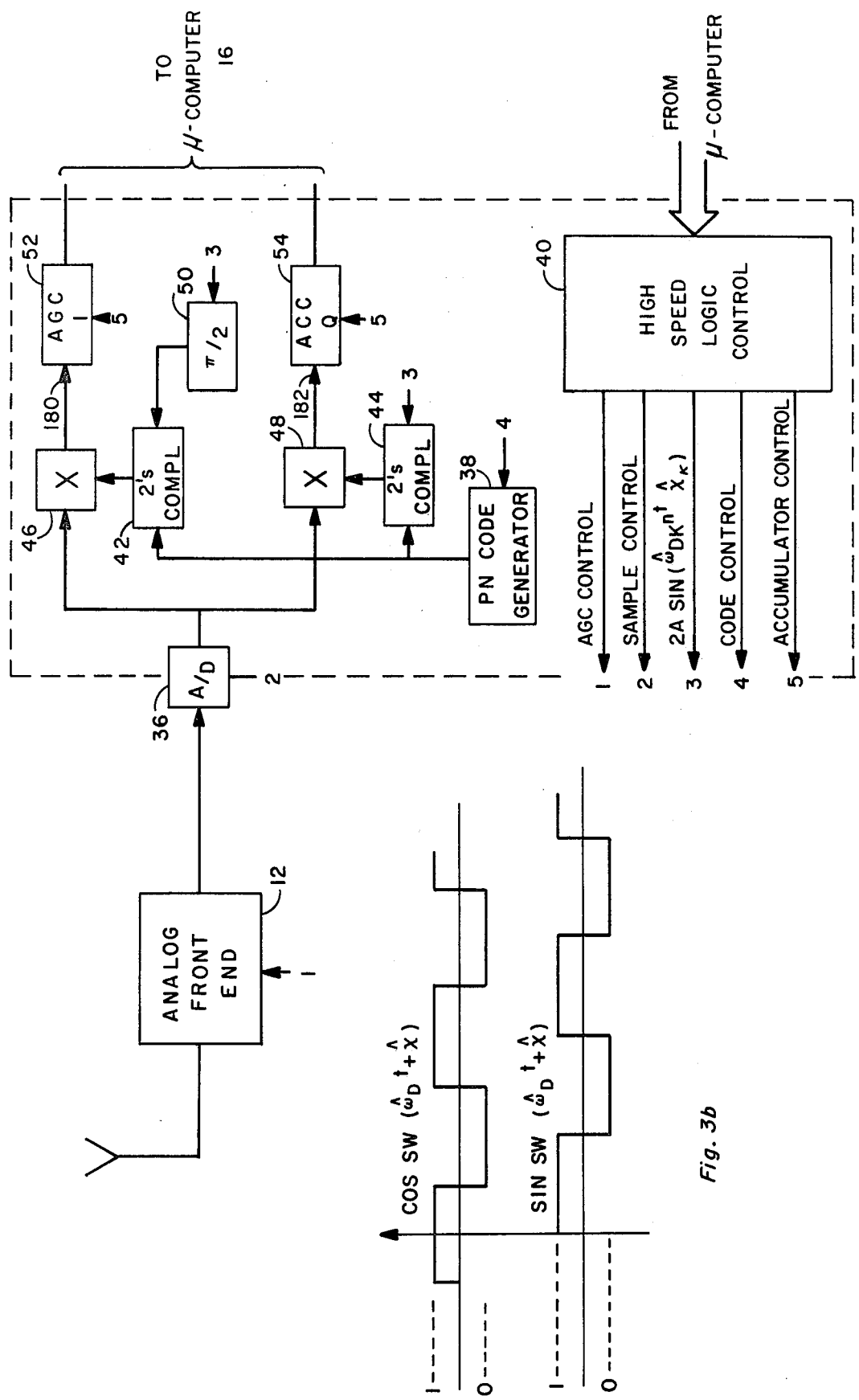

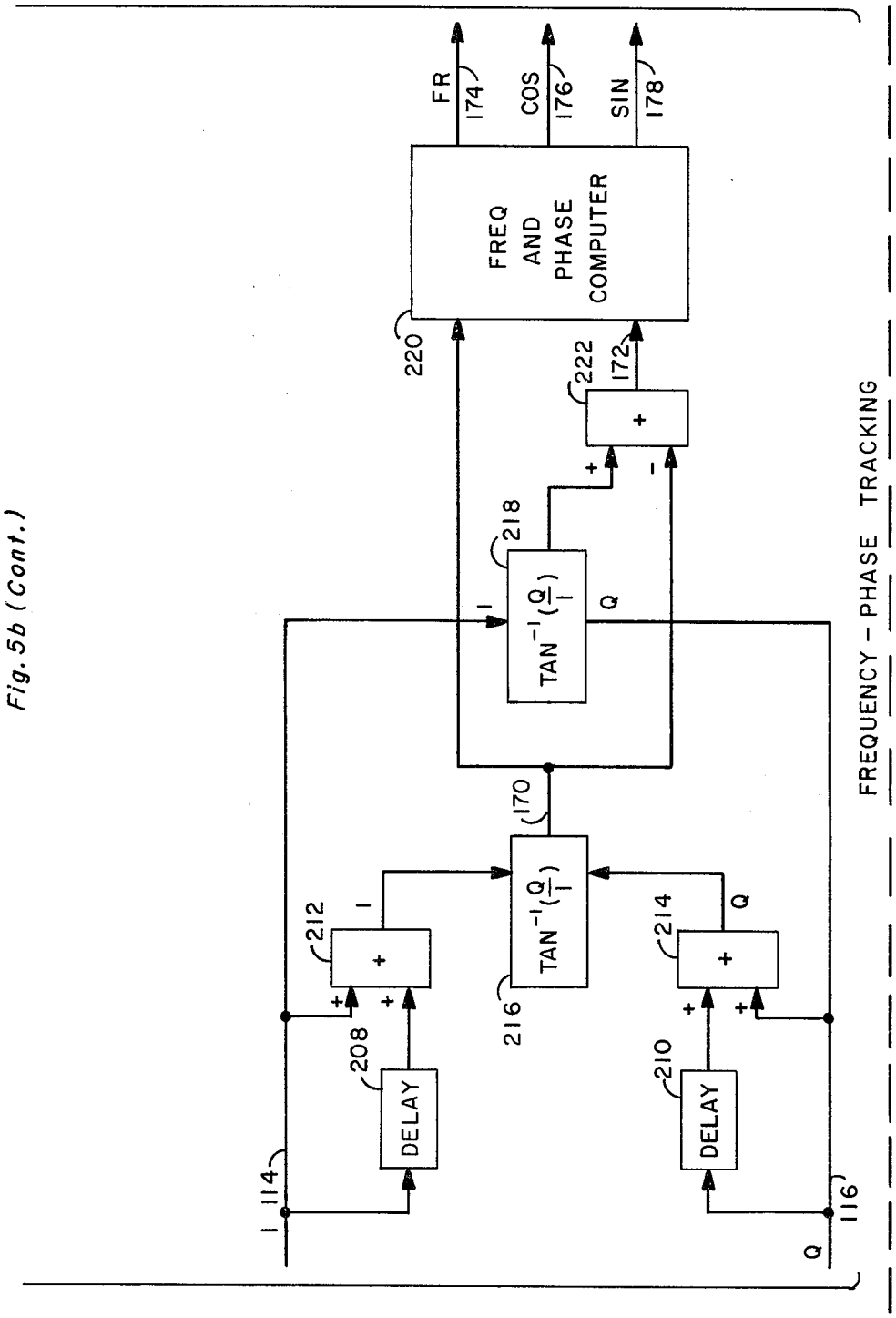

CORRELATION SYSTEM FOR GLOBAL POSITION RECEIVER

The government may have rights in this invention pursuant to Contract No. AF19(628)-80-C-0002 awarded by the U.S. Department of the Air Force.

BACKGROUND OF THE INVENTION

This invention relates to navigation receivers and, particularly, receivers for use in the global position system (GPS), a satellite-transmitted navigation signal system.

The GPS is being deployed by the United States government; when fully implemented it will consist of up to 24 satellites in precise orbits uniformly distributed over the globe providing continuous, world-wide, all-weather navigation information to all users equipped with a GPS receiver.

All GPS satellites broadcast at an identical carrier frequency, but each has a unique Pseudo-Noise (PN) code which modulates (multiples) the carrier. Present codes consist of 1023 consecutive chips of value +1 or −1 and approximately 1 $\mu$sec duration. The exact duration is such that 1023 consecutive chips take up exactly 1 msec. This is referred to as an epoch (code epoch). The uniqueness of the code manifests itself in the manner in which the pattern of +1s, −1s are arranged. The pattern repeats itself once every 1023 chips, or equivalently, every 1 msec.

Each satellite transmits data at a 20 msec/bit rate. Data bit boundaries are synchronized with epoch boundaries and occur once every 20 epochs. Data is differentially encoded. This means that a 1 is represented by the presence of 180° phase transition (sign reversal) at a data boundary and a 0 by the absence of such a transition.

The strength of the received signal is nominally −160 dBW ($10^{-16}$ below 1 watt). Because of losses and thermal effects the signal to noise ratio at the output of the antenna—preamplifier assembly is about −33 dB, i.e. the signal is 2000 times weaker than the background noise.

Signal detection is impossible unless the signal to noise ratio is somewhat in excess of 10 dB i.e. the signal is about 10 times stronger than the background noise. The initial task is to boost the signal without also amplifying the noise. The method used in the GPS system to achieve this end is referred to as "a spread spectrum" technique.

In its GPS implementation the satellite signal (in each satellite transmitter) is multiplied by a known unique sequence of +1, −1 amplitude pulses each lasting 1 $\mu$sec. This is the PN code referred to above. The effect of this operation is to spread the signal over a bandwidth equal to the reciprocal of the pulse duration 1 MHz in this case.

By multiplying the received signal by an exact replica of the code initially used, each +1 is multiplied by a +1 resulting in +1 and each −1 by a −1 also resulting in a +1. This process is referred to as correlation and effectively removes the initial modulation. However, since the PN code itself has a periodicity of 1 msec, the bandwidth of the signal after correlation is 1 kHz. Correlation therefore results in a bandwidth compression of a 1000 to 1 (30 dB). This results in a post-correlation signal to noise ratio of −3 dB. The remaining 13 or so dB needed to make the signal to noise ratio exceed 10 dB, and thereby render the signal detectable, are obtained by repeating the correlation process with the constantly incoming received signal.

In addition to the above, the signal will be degraded by unknown frequency offsets produced as a result of relative satellite and receiver motion together with a number of other minor causes. These are usually referred to as doppler offsets. Assuming there are M satellites visible at a particular time, the total signal as seen by the antenna of the receiver may be represented by $$\text{Signal} = \sum_{i=1}^{M} m_i(t + \tau_i)d_i(t)\cos[(\omega_C + \omega_{Di})t + \psi_i] + \text{Noise} \quad (1)$$

where
- $m_i$—PN code,
- $\tau_i$—unknown code phase (a multiple of 1 $\mu$sec, from 0 to 1022),
- $d_i$—data sequence,
- $\omega_C = 2\pi f$; f=carrier frequency,
- $\omega_{Di} = 2\pi f_{Di}$—unknown doppler,
- $\psi_i$—unknown signal phase, and
- t—time Although all PN codes for all satellites are known, one does not know, to start with, which satellites are currently visible and, of those that are visible, which of the 1023 possible code positions (phases) are being currently received. Moreover, if the unknown Doppler offset is excessive (larger than ±500 Hz) it will totally eliminate any processing gain the band-spreading techniques can provide. It is therefore necessary to determine the phases of the incoming codes and the doppler offset to within ±500 Hz before signal acquisition is possible.

Thus, the user element in the GPS must perform a variety of tasks, viz: it must identify the visible satellites; it must acquire signals from a sufficient number of the visible satellites to obtain pseudo-range information; it must track the acquired signals as the relative positions of the receiver and the satellites charges; and it must demodulate and convert the data to yield navigational information.

There exists a need for a receiver to perform the tasks identified above. Acquisition speed, accuracy and simplicity are among the principal criteria for a GPS receiver.

SUMMARY OF THE INVENTION

It has been discovered that a robust, efficient and economical receiver can be devised by employing a single digital channel operating at faster than real time and thereby creating a plurality of virtual channels each of which can be dedicated to a single satellite. By real time it is meant the smallest interval of time during which no information change takes place, that being, 1.0 $\mu$sec, the period of 1 chip. For example, my receiver may employ a high speed sampling rate of 100 nanoseconds and thereby dedicate 10 virtual channels to 10 GPS satellites, the practical maximum number which can be visible to receiver at any one time.

My receiver has the advantage of simplicity over multi-channel receivers; clocking and synchronization requirements are greatly reduced. At the same time, my receiver avoids the problem which typically faces single-channel receivers: potential information loss during sequential operations.

Since 10 MHz processing rates are certainly achievable with my receiver, it is possible to track at least 10 satellites simultaneously. Initial acquisition times may be reduced by an order of magnitude, effectively reducing receiver sensitivity to input signal fluctuations. Since switching between separate receivers is not necessary, this substantially decreases control systems, permits tighter control loop parameters, improves noise rejection and relaxes the requirement for reference oscillator precision.

My invention will be described below with reference to a preferred embodiment; however, it should be noted that various changes and modifications can be made by those skilled in the art without departing from the spirit and scope of the invention. For example, the number of virtual channels can be increased or decreased. Other techniques can be used for signal compression; other codes can be employed by the satellite and receiver. Although 1 bit digital quantization is proposed in many aspects of my preferred embodiment, analog to digital conversions of longer bit streams may be substituted. Various changes can be made in the proposed methods of code tracking, frequency-phase tracking, and data extraction. Moreover, the essential teachings of my invention may be implemented in other receivers for use in systems other than the GPS and for purposes other than navigation.

BRIEF DESCRIPTION OF THE FIGURES

FIG. 3a is a schematic diagram of a means for realizing either the acquisition correlation system or tracking correlation system shown in FIG. 2;

FIG. 3b is a graph of the quadrature waveforms which may be used in the correlation system of FIG. 3a.

DETAILED DESCRIPTION OF THE PREFERRED EMBODIMENT

Figure 1:
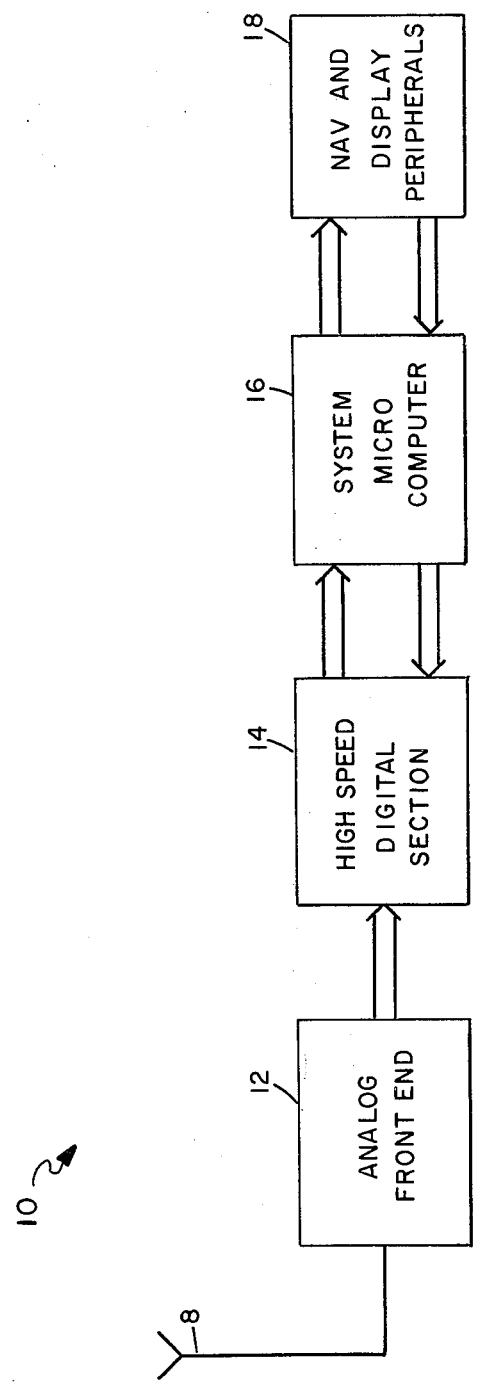
FIG. 1 is an overall schematic diagram of a global position system receiver.

FIG. 1 shows the main components of my receiver 10. Signals are received by antenna 8 and down-converted to base-band by the analog front end 12. The high-speed digital section 14 takes the analog signal and converts it to a digital waveform which is sampled and correlated with known codes in quadrature channels (called the I-channel and Q-channel hereinafter) to obtain data. The data may then be processed at a lower speed by the system microcomputer 16 and fed to navigation and display peripherals 18. Feedback between the peripherals 18 and the system computer 16 as well as between the system 16 and the high-speed digital section 14 permits continuous updating of information.

Figure 2:
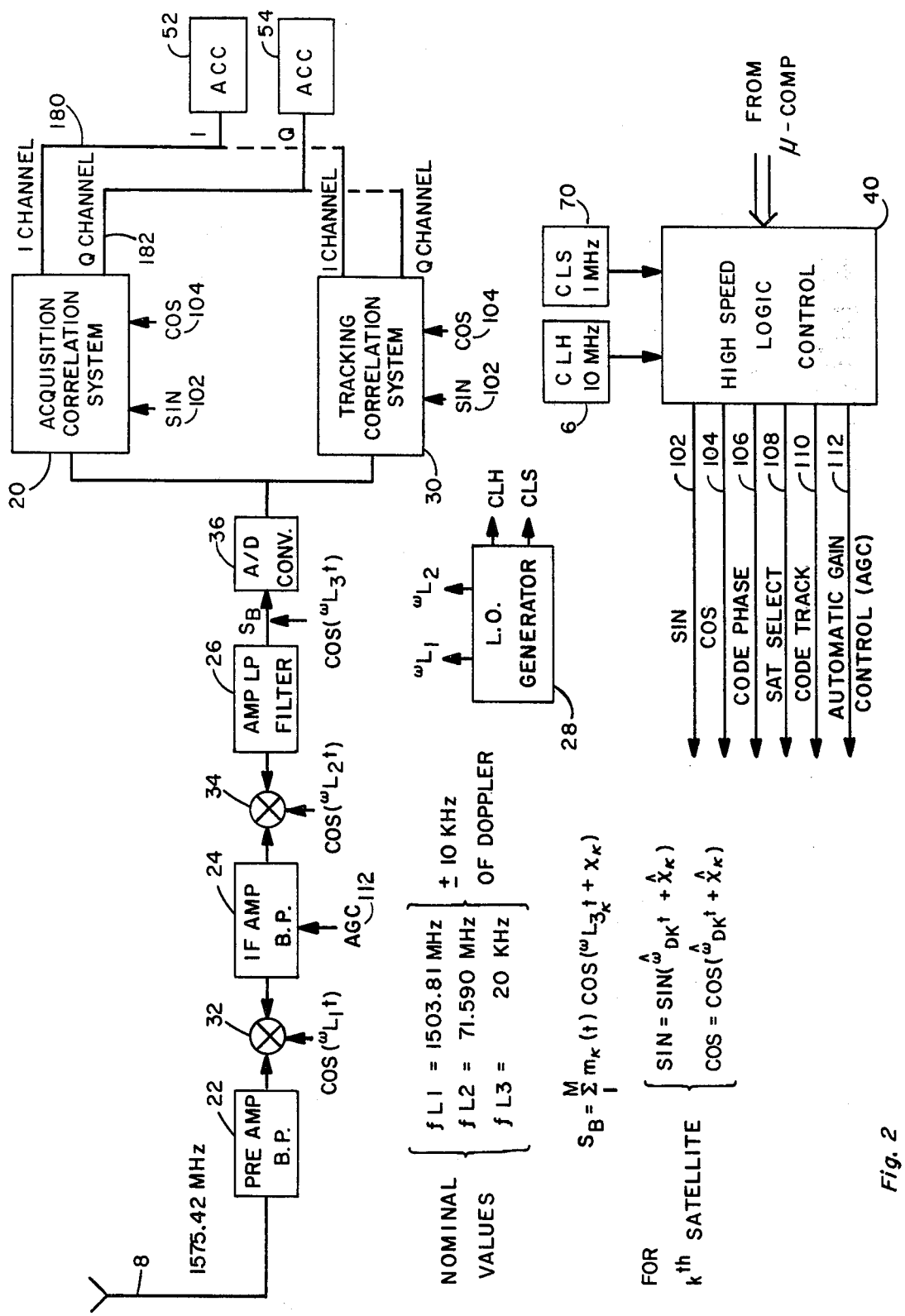
FIG. 2 is a schematic diagram of an analog front end and high speed acquisition and tracking means for the receiver.

In FIG. 2 the front end 12 and high-speed digital section 14 are detailed. The antenna 8 is connected to a pre-amp, band-pass filter 22. From filter 22, the incoming signal is processed in a radio-frequency mixer 32 and then an intermediate frequency amplifier, band-pass filter 24. The signal is then mixed again in an intermediate frequency mixer 34 and processed by an amplifier, low-pass filter 26 to produce the base band signal, $S_B$. The base band signal is converted to digital form in A/D converter 36 and fed to both the acquisition system 20 and the tracking system 30.

The high-speed logic control 40 is connected to the microcomputer 16 and generates quadrature comparison signals 102 and 104 as well as control signals for satellite selection 108, code phrase 106, code tracking 110 and automatic gain control 112. (The gain control signal may be used to vary the degree of amplification in band pass filter 24). Most functions of the high speed logic control 40 will be performed at 10 MHz while some functions can be performed at 1 MHz; to meet these needs a local oscillator 28 supplies high speed and low-speed clock signals, 6 and 70, respectively. Oscillator 28 also supplies the signals necessary for radio-frequency and intermediate frequency mixing in mixers 32 and 34.

The A/D converter 36 may be a high speed analog voltage comparator adjusted to change output wherever the input changes polarity, in which case it will be a one bit quantizer. The output of the converter 36 is correlated in the acquisition system 20 with the quadrature signals 102 and 104 generated by control 40. The resulting correlations are fed through the I-channel 180 and the Q-channel 182 to accumulators 52 and 54, respectively. Once accumulated, the signals may be further processed at low speed by the microcomputer 16. A similar process occurs in the tracking system 30.

In FIGS. 3a and 3b a correlation system (20 or 30) and the high speed control 40 are shown in more detail. When the correlation system is a signal acquisition system, a trial-and-error approach can be taken to acquire each satellite. The potential range of doppler spread ($\pm 10$ kHz) is divided into 20 1 kHz doppler cells. The code phase is divided into the 1023 possible code phase positions. The correlation process is tried in turn for each possible doppler cell and each possible code position until a detection is achieved. When that happens the code phase is known to within 1 $\mu$sec and doppler uncertainty is reduce to $\pm 500$ Hz.

During acquisition, control 40 sends automatic gain control signals 1 to front end 12 and sampling signals 2 to quantizer 36 to obtain a reasonably consistant digital signal every 0.5 $\mu$sec. Control 40 then begins a correlation at a specific Doppler shifted frequency by sending comparison signal 3 to the correlation system. Signal 3 is converted to quadrature in one channel by converter 50 to produce the signals shown in FIG. 3b. The quadrature signals are then combined in two's-complementers 42 and 44, respectively, with a selected code produced by generator 38 in response to code control signal 4. The outputs of two's-complementers 42 and 44 are multiplied by the sample signal in multipliers 46 and 48 and the products accumulated in accumulators 52 and 54, respectively.

In my receiver, multipliers 46 and 48 are designed to perform correlations for a plurality of sources, say 10 satellites, at once. This can be achieved by changing the codes generated at generator 38 rapidly, say 0.1 $\mu$sec, and accumulating each multiplication. The effect is the creation of a plurality of virtual channels, each independently accessible by an equally rapid accumulation signal 5 from control 40 to accumulators 52 and 54.

The multipliers 46 and 48 perform correlations for each of the 10 satellites. Each code has a period of 1023 chips, referred to as an epoch. It may take 10 or more epochs for a correlation peak to become detectable. Only one output (of say one byte) per detection will be passed on resulting in a data rate reduction of $10^4$ or more. The accumulators 52 and 54 are used to sum the $10^4$ (or more) correlation multiplier outputs.

If after a suitably long period of time, no correlation is obtained for a particular code after all the doppler cells have been tried, it can be assumed that the satellite broadcasting this code is not visible and another code selected. If a correlation is obtained, a somewhat different operation of code tracking must be performed. In the tracking mode, code phase advancement is stopped and the sampling signal 2 from control 40 to converter 36 is varied in response to feedback from various error-functions, discussed below, to further reduce pseudo-range uncertainty.

Figure 4A:
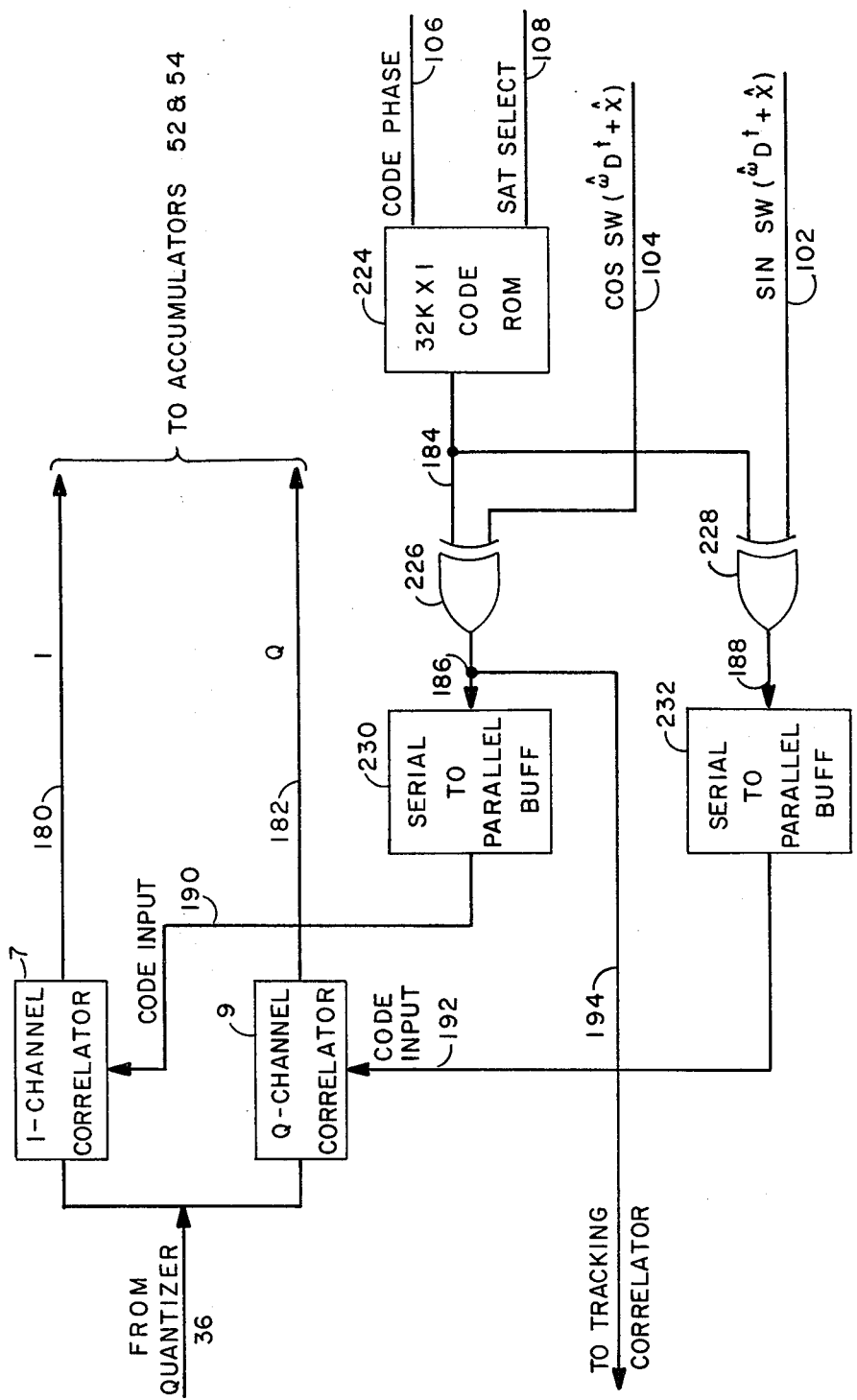
FIGS. 4a and 4b are detailed schematic diagrams of an implementation of the acquisition correlation system.
Figure 4B:
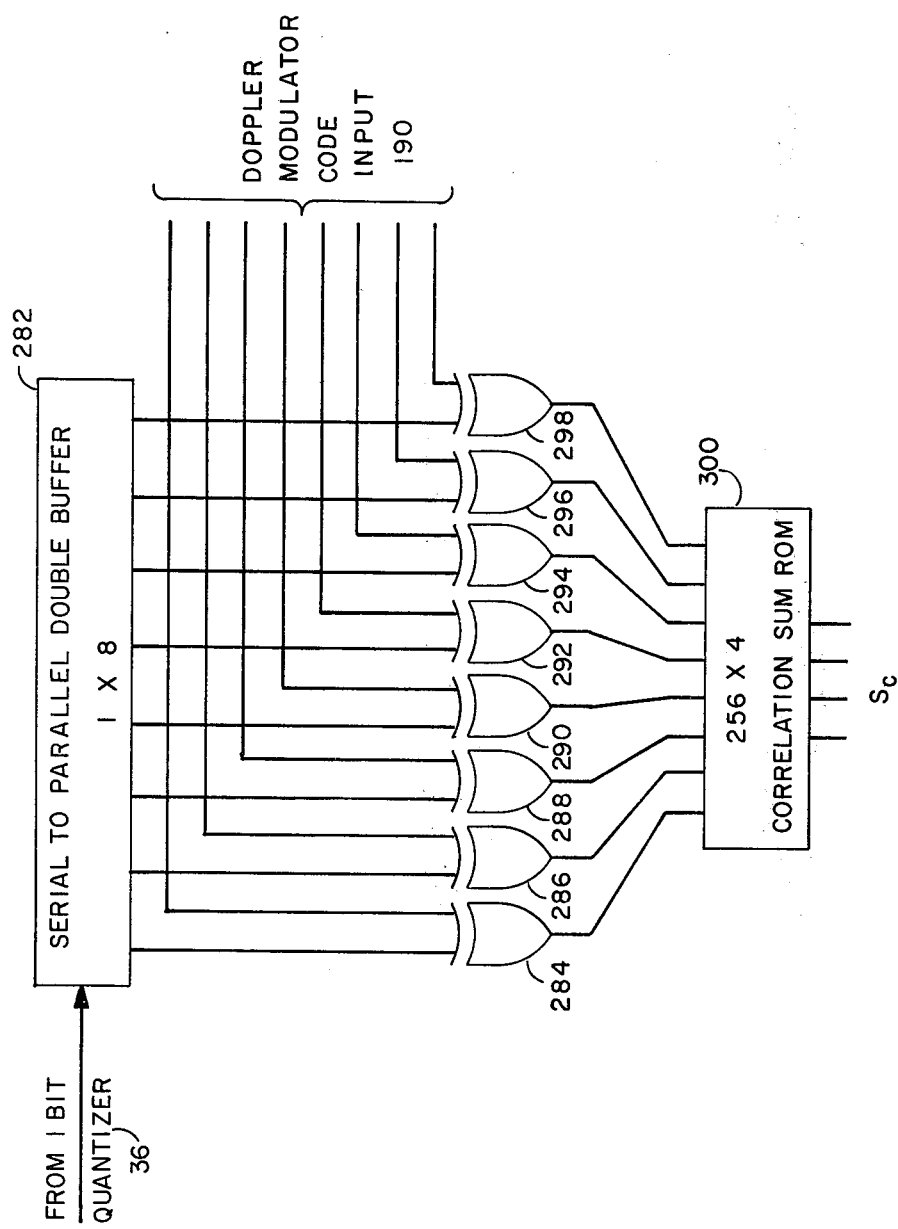

In FIGS. 4a and 4b one hardware implementation of an acquisition correlation system is detailed. The acquisition correlation system depicted in FIG. 4a has two acquisition correlators 7 and 9, one for each quadrature channel. It also contains the code ROM 224 which has to store all satellite codes in 1 bit form i.e. $+1=1$, $-1=0$. This implies a $32k \times 1$ device most easily implemented in a $4k \times 8$ or two $2k \times 8$ ROMs followed by an 8 bit parallel to serial double buffer. The cosine and sin square waves 102 and 104 as shown in FIG. 3b are used together with the code bit stream 184 to produce the quadrature doppler modulated code inputs 186 and 188 by use of exclusive ORs 226 and 228. The two serial data streams are next converted to 8 bit parallel format 190 and 192 as required by the acquisition correlators 7 and 9. The serial bit stream in the quadrature channel 194, just prior to parallel conversion, is used as an input to the tracking system 30.

In FIG. 4b the structure of one correlator, for example, correlator 7, is expanded. In this correlator, the data from quantizer 36, sampled once every 500 nsec (twice per code chip), is accumulated into a system of double buffered $1 \times 8$ bit serial to parallel registers 282. When one register is full, the input is switched to the other one. Meanwhile the first register is switched to parallel output operation and all 8 bits are combined with the doppler compensated code input 190 in half-adders (exclusive-OR) 284-298 to give a correlation. This is further translated into a binary correlation sum $S_c$ in the correlation sum ROM 190. It takes 4 μsec to fill one buffer. The correlation operation however is done at a 10 MHz rate. Thus during the first 100 nsec 8 code position are correlated for satellite 1, during the next the same is done for satellite 2 and so on. During one μsec therefore 8 code position correlations have been performed for all 10 satellites under investigation. The same operation is repeated during the next μsec and so on until at the end of 4 μsec all data is exhausted. The second buffer, which is now full, is made available to the correlation process while the first starts accepting new data. This system therefore represents an 8-fold increase in correlation rate over one employing only a single correlator. Generally, the increase in correlation rate is equal to the number of correlators used.

Figure 5A:
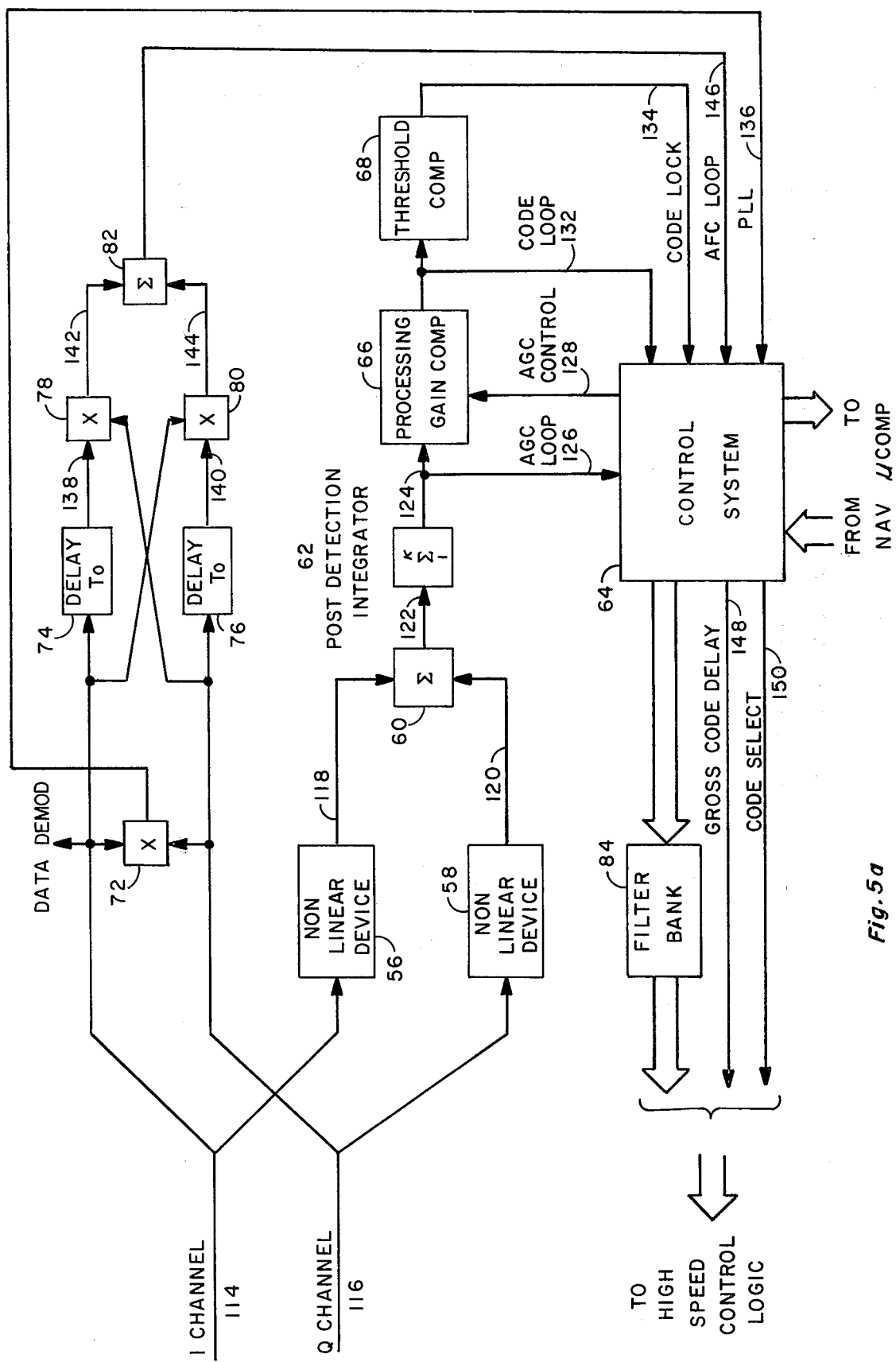
FIGS. 5a and 5b are schematic diagrams of the microprocessor functions of the receiver.
Figure 5B:
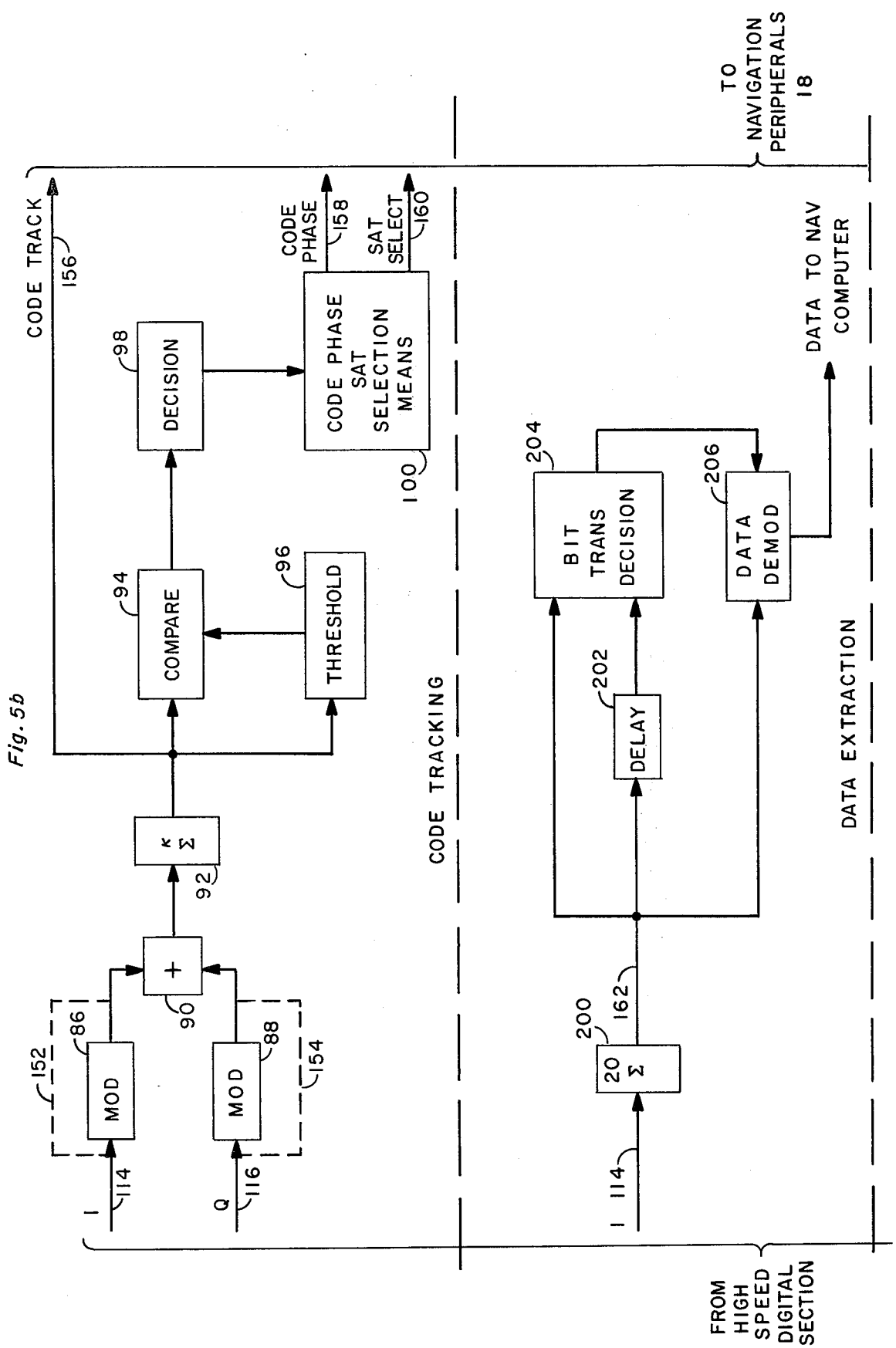

In FIGS. 5a and 5b the major computing functions of my receiver are shown. In FIG. 5a data from the previously discussed accumulators is received on the I-channel 114 or the Q-channel 116; the two quadrature signals 114 and 116 go through Non-Linear Detectors 56 and 58, respectively. The outputs are combined in summer 60 and further summed in the Post Detection Intergrator 62. The processing of the output of integrator 62 depends on the function implemented. For automatic gain control (AGC) the output goes to a loop filter 84 and then further to the high speed control logic to complete the loop. AGC has two operational modes. It is used to decrease noise floor functions by monitoring system noise and feeding back a control signal to the IF amplifier (see FIG. 2). These computations are done for all satellites in common. AGC is also used for each satellite individually to maintain satellite signal strength at a constant level. The noise in each satellite channel is monitored and used to provide a processing gain (P.G.).

During satellite acquisition the output 124 of the post detection integrator 62 is fed to a processing gain computer 66 along with the filtered automatic gain control signal 128. The computer 66 generates a code loop signal 132. This signal 132 is also fed to a threshold comparison means 68, which generates a code lock signal 134. The threshold output is converted into code control information in control system 64 and transmitted to the high speed portion of the system. When a detection is achieved, threshold computation is discontinued and the code loop is engaged.

The need to minimize doppler induced system losses and to extract carrier borne navigation data makes it necessary to acquire and track the satellite carrier. This task is shown functionally in the top half of FIG. 5a. A delay type digital Automatic Frequency Control (AFC) loop 146 is used initially to reduce the frequency uncertainty from that permitted by one doppler cell down to a value from which the Phase Locked Loop (PLL) 136 can pull into phase lock.

The AFC loop consists of delay elements 74 and 76 which receive the I-channel signal 114 and the Q-channel signal 116 respectively; the outputs 138 and 140 of delays 74 and 76, respectively are then multiplied by their non-delayed, quadrature complements in multipliers 78 and 80. The products are summed in element 82 to produce the AFC loop signal 146. The phase lock loop 136 is formed by multiplying signals 114 and 116 together in a Costas phase lock multiplier 76. Filter bank 84 contains low pass filters for each loop so that rapid fluctuations are discounted and only progressive trends relayed to the high speed system. Once phase lock is achieved, the system enters steady state operation during which AGC, code and carrier loop computations are maintained for as long as the particular satellite is visible.

In FIG. 5b the code-tracking, frequency-phase tracking and data extraction tasks of the micro-computer are shown functionally. In the upper portion of FIG. 5b, signals 114 and 116 are initially operated upon by modulus non-linearities 86 and 88, respectively, the products are fed to summation means 90 and then to integrator 92. The output of integrator 92 is compared in comparison means 94 with a threshold value from threshold means 96. Decision means 98 determines whether the comparison warrants a change in the code phase signal 158 or the satellite selection signal 160, which signals are effected by selector 100. Once a satellite is acquired a code tracking signal 156 is sent to the navigation peripheral 18 and the incoming signal can by-pass elements 86 or 88 along path 152 or 154.

In the lower portion of FIG. 5b an alternative to the frequency and phase tracking of FIG. 5a is shown. The incoming signals 114 and 116 are exposed to delays 208 and 210. Each delayed signal is combined with its undelayed self in summers 212 and 214, and the results are compared by a frequency discriminator 216. The non-delayed quadrature channels are likewise compared in a phase discriminator 218. The discriminator outputs, as well as their sums are fed to the frequency and phase computer 220, which generates signals 174, 176 and 178 for transmission to the navigation peripherals 18.

Once the code and its frequency and phase are adequately tracked, navigational information can be extracted. Since data bits are transmitted every 20 epochs in the GPS, the in-phase signal 114 is operated upon by integrator 200 over twenty epochs. The integrator output signal 162 is delayed by element 202 and then compared with its undelayed self in decision means 204. Once the data bit boundaries are determined by monitoring for a sufficiently long period of time, the data may be read by demodulator 206 and transmitted.

Code tracking for navigation purposes requires that the accuracy of the code phase be resolved below the 1 μsec period of the chip. The goal of any receiver in a GPS system should be about 50 nanosecs or equivalently 15 m in pseudo-range.

Figure 6A:
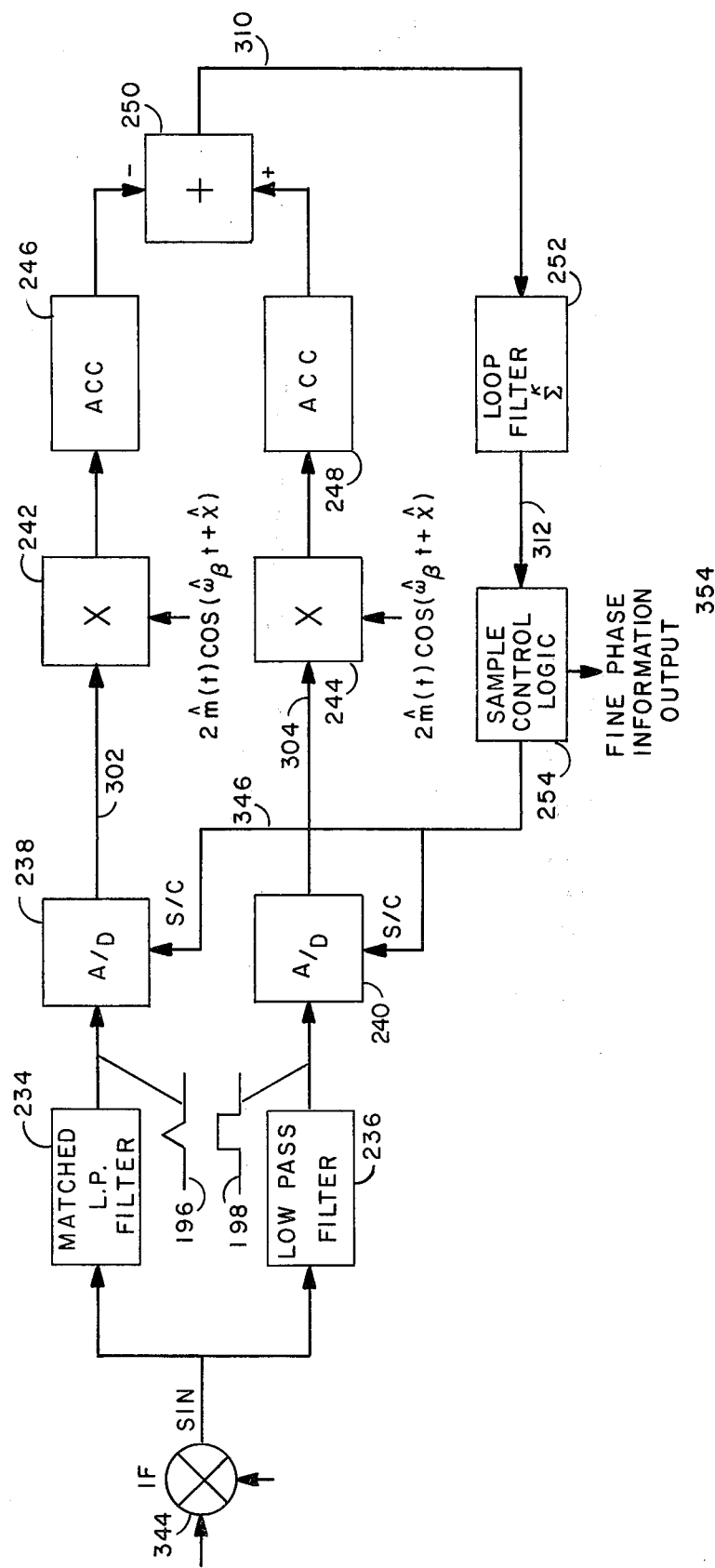
FIGS. 6a and 6b are schematic diagrams of alternative embodiments of a code tracking means for the receiver.

In FIG. 6a one means for fine code tracking is illustrated. The intermediate frequency signal $S_{in}$ at the front end of the receiver is fed to two filters 234 and 236. Filter 234 in the upper arm is matched to a one μsec square pulse and is low-pass. Filter 236 in the lower arm is a straight forward low-pass of sufficiently wide bandwidth to pass the 1 μsec pulse substantially unaltered and with as closely as possible the same delay as the matched filter. This requirement permits the samples in both channels to represent $S_{in}$ samples at the same time.

The output of filter 234 will be a triangular pulse 196 while filter 236 will pass a square pulse 198. Analog-to-digital converters 238 and 240 will sample signals 196 and 198 at 50 nanosec intervals. The output signals 302 and 304 are then each multiplied by the expected doppler shifted code in multipliers 242 and 244, and accumulated in accumulators 246 and 248 respectively. The accumulated sums are added in summer 250 and processed in loop filter 252. The resulting signal 312 can be used by logic means 254 to advance the sampling rate until a minimum is reached indicating that sampling is occurring at the midpoint of the chip's period.

Figure 6B:
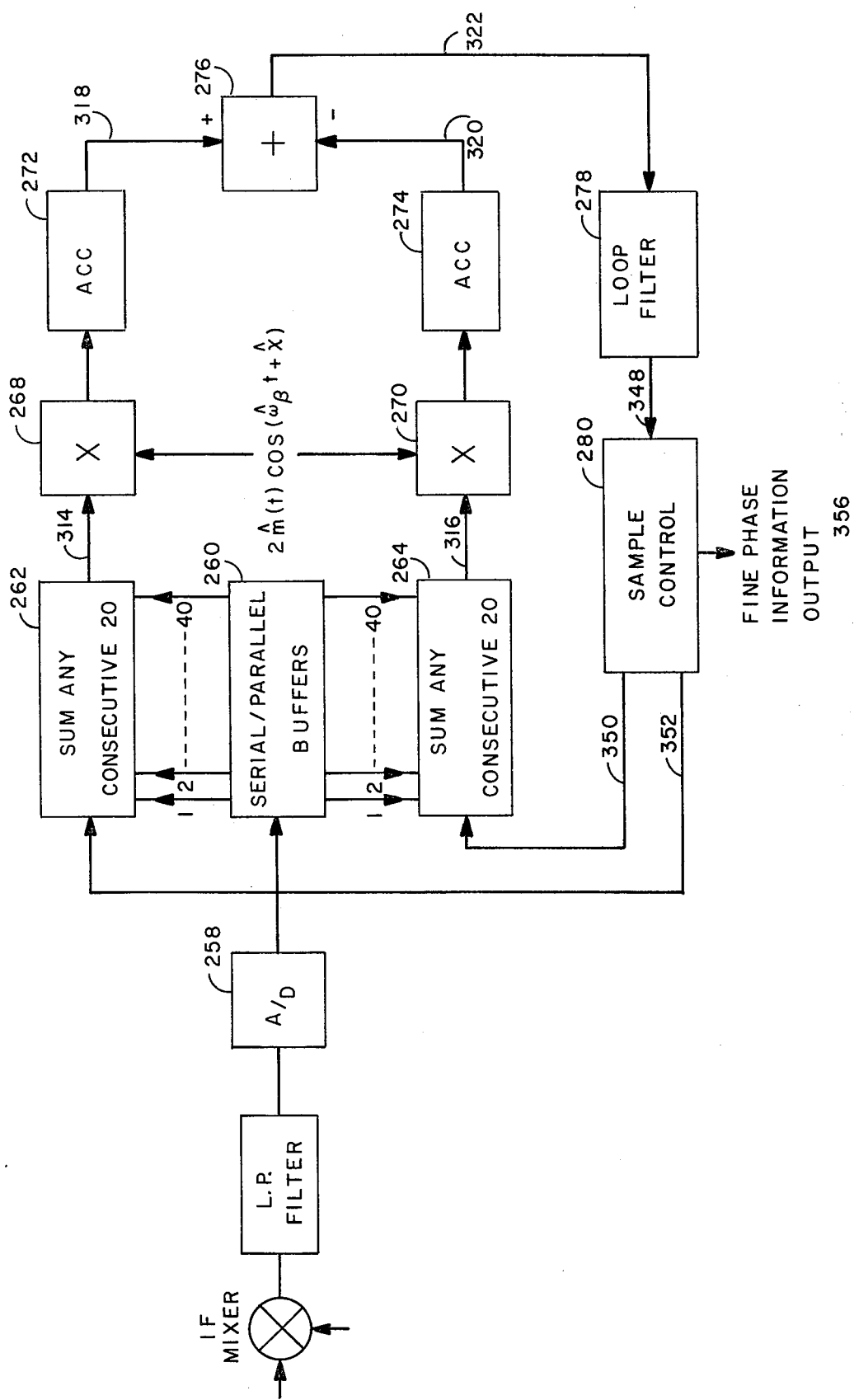

In FIG. 6b a different approach to code tracking is shown.

Again it is assumed that phase coherence is maintained so only the in-phase channel is being used. FIG. 6b is a digital realization of the delay-locked loop. The A/D converter 258 samples incoming signals at a 20 MHz rate, continuously. The samples are placed into a set of serial to parallel buffers 260 having a capacity of 40 samples. The parallel outputs, all 40 of them go into a logic/ROM assembly capable of summing any consecutive 20 of them in 100 nsec.

The top assembly 262 will always be offset from the bottom assembly 264 by same fixed amounts. Outputs from 262 and 264 go to the correlation multipliers 268 and 270 respectively which now has to be at least 6 bits wide. The outputs of these are summed in the accumulators 272 and 274 over typically one epoch. The accumulator outputs are subtracted in element 276 and further summed in the loop filter 278, which eventually provides an input to the sample control 280 which influences which 20 samples are to be summed.

The system of FIG. 6b will have the same performance as that of FIG. 6a, provided the same number of quantization levels are used.

In conclusion, the receiver described above is believed to possess all the features necessary to acquire, track, and decipher data from GPS satellites in an efficient, accurate and economical manner.

What I claim is:

1. A receiver for receiving and interpreting superimposed signals originating from a plurality of sources, the signals each comprising a code portion identifying the specific source and a data portion transmitting information.

the codes being chosen such that when the receiver correlates the code portion of a signal from a particular source with a matching code stored in a memory in the receiver a substantially increased signal is accumulated while all other accumulations between the signal and other stored codes remain substantially below true correlation levels, the receiver comprising:

(a) down-converting means for converting the superimposed signals to a lower frequency, base band signal, the base band signal comprising each of the signals from the separate sources, their individual frequencies having been shifted by differing amounts as a result of Doppler and interference effects;

(b) an analog-to-digital conversion means for quantizing the base band signal into a string of chips having binary values;

(c) memory means for storing the codes which identify each of the sources; and (d) faster-than-real-time correlation means for correlating the code portions of individual signals with matching codes stored in the memory means and, thus, identifying available sources so that data can be extracted, the correlation means connected to the conversion means to receive the binary chips and connected to the memory means to receive particular codes upon request, the correlation means comprising:

(i) a high-speed sampling means for multiple sampling each chip during its duration;

(ii) a variable frequency shifting means for shifting the frequency of stored code sequences;

(iii) multiplication means for multiplying the frequency shifted stored codes by a sequence of chip values taken from the high-speed sampling means;

(iv) accumulator means for accumulating the products of multiplication means; and (v) control means for requesting particular codes, varying their frequency and sequence so that by repeated faster-than-real-time sampling of the digitally-converted, base band signal, the code portion of a signal from a particular source can be correlated with a particular code, thus, permitting the receiver to operate as if it had a plurality of virtual channels whereby each of the plurality of virtual channels can track one of the superimposed signals from the plurality of sources as identified by its code and receive the data portion of the signal transmitted therefrom.

2. The receiver of claim 1 wherein the correlation means further comprises a first and second parallel processing channels, the second channel being in a quadrature configuration relative to the first channel, to insure proper-phase matching.

3. The receiver of claim 1 wherein the receiver further comprises a non-linear device to compensate for variations in the Doppler shift of individual signals.

4. The receiver of claim 1 wherein the receiver further comprises automatic gain control means for preventing excessive noise floor fluctuations.

5. The receiver of claim 1 wherein the correlation means further comprises auto gain control means for selectively preventing excessive noise floor fluctuations, the gain control being tailored to the specific signal being sought.

6. The receiver of claim 2 wherein the receiver further comprises code-tracking means for maintaining a proper phase-lock on an incoming signal, said tracking means comprising:
   (i) first and second delays to receive signals from the first and second channels respectively and impart a variable delay to at least one of said channels; and
   (ii) comparator means for determining the effect of such delays, whereby the chip width and phase information can be obtained.

7. A receiver for receiving and interpreting superimposed signals originating from a plurality of sources, the signals each comprising a code portion identifying the specific source, the code portion comprising of an epoch of consecutive chips, and a data portion transmitting information, the data portion comprising differentially encoded signals generated at a specific source by inversion of one or more epochs of the code portion of the signal, the receiver comprising:
   (a) the receiver of claim 1; and
   (b) a data acquisition means for acquiring the information transmitted from each source, the acquisition means comprising means for determining the end of an epoch of chips and means for detecting inversions in the epoch sequence, whereby data is received in a binary form depending on the state of the epoch.

* * * * *